(12) United States Patent
Chen et al.

(10) Patent No.: US 11,397,353 B1
(45) Date of Patent: Jul. 26, 2022

(54) DISPLAY PANEL, DISPLAY MODULE AND ELECTRONIC DEVICE

(71) Applicant: JRD Communication (Shenzhen) LTD., Guangdong (CN)

(72) Inventors: Ping Chen, Guangdong (CN); Ke Lin, Guangdong (CN); Yang Yu, Guangdong (CN); Jitao Ma, Guangdong (CN); Yafang Xi, Guangdong (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 0 days.

(21) Appl. No.: 17/228,762

(22) Filed: Apr. 13, 2021

(30) Foreign Application Priority Data

Feb. 9, 2021 (CN) .......................... 202110177406.7

(51) Int. Cl.
*G02F 1/1335* (2006.01)
*G02F 1/1333* (2006.01)

(52) U.S. Cl.
CPC .. *G02F 1/133616* (2021.01); *G02F 1/133331* (2021.01); *G02F 1/133512* (2013.01); *G02F 1/133524* (2013.01); *G02F 1/133553* (2013.01)

(58) Field of Classification Search
CPC ......... G02F 1/133308; G02F 1/133314; G02F 1/133317; G02F 1/133332; G02F 1/133322; G02F 1/133328; G02F 1/133616; G02F 1/133512; G02F 1/133615; G02F 1/133553; G02F 1/133524
See application file for complete search history.

(56) References Cited

U.S. PATENT DOCUMENTS

| | | | |
|---|---|---|---|
| 9,781,853 B1 * | 10/2017 | Witmer | H05K 7/12 |
| 9,927,650 B1 | 3/2018 | Almanza-Workman et al. | |
| 11,079,630 B1 * | 8/2021 | Sprague | G02B 6/0068 |
| 2005/0023433 A1 * | 2/2005 | Ishitaka | B29C 45/37 249/134 |
| 2013/0236680 A1 * | 9/2013 | Ahn | G02F 1/133308 428/68 |
| 2014/0049983 A1 * | 2/2014 | Nichol | G02B 6/0028 362/610 |
| 2016/0223734 A1 * | 8/2016 | Hsu | G02B 6/0018 |
| 2017/0199423 A1 * | 7/2017 | Cheng | G02F 1/133553 |
| 2018/0252981 A1 * | 9/2018 | Gupta | G02B 6/0073 |
| 2019/0079324 A1 | 3/2019 | Numata et al. | |
| 2021/0055605 A1 * | 2/2021 | Yamashita | G02B 6/0088 |

OTHER PUBLICATIONS

European Search Report and the European Search Opinion dated Sep. 29, 2021 From the European Patent Office Re. Application No. 121162932.4. (8 Pages).

* cited by examiner

*Primary Examiner* — Jia X Pan

(57) ABSTRACT

A display panel, a display module, and a display device are provided. The display panel includes a total reflection display unit and a frame enclosing the reflective display unit. The frame includes a light-shielding portion and a reflective layer. The light-shielding portion has a first surface parallel to a first direction and a second surface oppositely located to the first surface. The reflective layer covers the first surface or the second surface. The reflective layer can reflect the light irradiated on the surface of the light shielding portion or entering the light shielding portion back to the total reflection display unit again, avoiding the waste caused by the scattered light caused by the propagation path of the light, thereby improving the utilization rate of light.

12 Claims, 3 Drawing Sheets

DISPLAY PANEL, DISPLAY MODULE AND ELECTRONIC DEVICE

CROSS REFERENCE

This application claims the priority of Chinese Patent Application No. 202110177406.7, entitled "Display Panel, Display Module and Electronic Device", filed on Feb. 9, 2021, the disclosure of which is incorporated herein by reference in its entirety.

FIELD OF THE INVENTION

The present disclosure relates to a display technology, and more particularly, to a display panel, a display module and an electronic device.

BACKGROUND

With the rapid development of communication technology and the widespread use of electronic devices such as smart phones, tablet computers, and notebook computers, electronic devices are developing in a diversified and personalized direction. Nowadays, electronic devices such as mobile phones and tablet computers have become electronic devices that people carry with them daily, and increasingly become indispensable electronic devices in people's life and work. Electronic equipment is often equipped with a liquid crystal display (LCD) or an active-matrix organic light-emitting diode (AMOLED) display. Such displays require a backlight module or self-luminous light sources to be lit, and the blue light carried by the light source is harmful to human eyes.

In order to provide users with a more comfortable reading experience, most manufacturers currently on the market set the screen as a Reflective Liquid Crystal Display (RLCD) to achieve an effect similar to a paper book through electronic ink, which not only reduces power consumption, but also protects the eyesight of users. RLCD is a totally reflective screen that cannot emit light by itself. It is a kind of LCD screen that needs to reflect external ambient light to achieve display. The terminal based on this screen design has a good eye protection function. In the prior art, the RLCD realizes the display function by reflecting the outside/front light, and the manufacturer usually installs a light-shielding portion around the display panel to prevent the light source from being scattered to ensure the display effect of the display panel. However, part of the light irradiated in the RLCD to be scattered to the light-shielding portion around the display panel, resulting in low light utilization, thereby affecting the product performance of the RLCD.

SUMMARY

One objective of an embodiment of the present disclosure is to provide a display panel, a display module and an electronic device that could raise the light utilization by disposing a reflective layer on a surface of the light-shielding portion.

According to an embodiment of the present disclosure, a display panel includes a total reflection display unit and a frame enclosing the reflective display unit. The frame includes a light-shielding portion and a reflective layer. The light-shielding portion has a first surface parallel to a first direction and a second surface oppositely located to the first surface. The reflective layer covers the first surface or the second surface.

Optionally, the light-shielding portion further comprises a third surface perpendicular to the first direction and away from the total reflection display unit.

Optionally, the reflective layer covers the second surface and the third surface.

Optionally, a thickness of the frame is similar to a thickness of the total reflection display unit.

According to an embodiment of the present disclosure, a display module includes a display panel, an optical glue, and a light guide plate. The display panel includes a total reflection display unit and a frame enclosing the reflective display unit. The frame includes a light-shielding portion and a reflective layer. The light-shielding portion has a first surface parallel to a first direction and a second surface oppositely located to the first surface. The reflective layer covers the first surface or the second surface. The light guide plate is stacked and fixed with the total reflection display unit through the optical glue. Light sources are disposed near the light guide plate.

Optionally, a plurality of light guide dots are disposed on an end surface of the total reflection display unit.

Optionally, the light guide plate comprises a first light guide area corresponding to the frame and a second light guide area corresponding to the total reflection display unit, and a number of light guide dots in the first light guide area is greater than the number of light guide dots in the second light guide area.

Optionally, the light guide dots in the first light guide area are gradually decreased along a second direction, and the second direction is consistent with an irradiation direction of the light source.

Optionally, the display module further comprises a cover glass stacked with the light guide plate. A cover reflective layer is disposed near the light guide plate.

According to an embodiment of the present disclosure, an electronic device includes a display module, a housing, and a circuit board disposed within the housing, electrically connected to the display module. The display module is disposed on the housing. The display module includes a display panel, an optical glue, and a light guide plate. The display panel includes a total reflection display unit and a frame enclosing the reflective display unit. The frame includes a light-shielding portion and a reflective layer. The light-shielding portion has a first surface parallel to a first direction and a second surface oppositely located to the first surface. The reflective layer covers the first surface or the second surface. The light guide plate is stacked and fixed with the total reflection display unit through the optical glue. Light sources are disposed near the light guide plate.

According to the present disclosure, a display panel, a display module, and a display device are provided. The display panel includes a total reflection display unit and a frame enclosing the reflective display unit. The frame includes a light-shielding portion and a reflective layer. The light-shielding portion has a first surface parallel to a first direction and a second surface oppositely located to the first surface. The reflective layer covers the first surface or the second surface. The reflective layer can reflect the light irradiated on the surface of the light shielding portion or entering the light shielding portion back to the total reflection display unit again, avoiding the waste caused by the scattered light caused by the propagation path of the light, thereby improving the utilization rate of light.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION OF PREFERRED EMBODIMENTS

Figure 1:
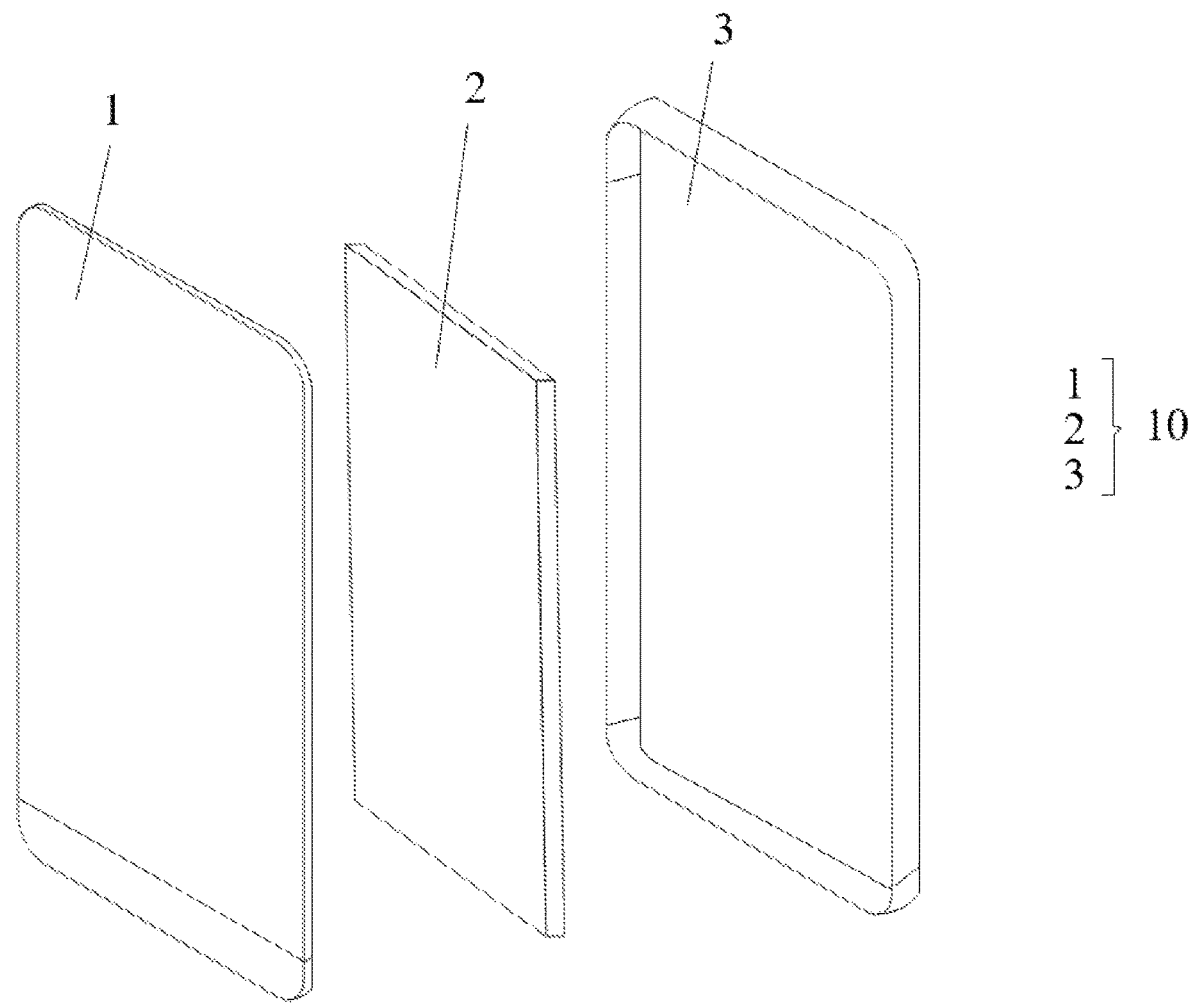
FIG. 1 illustrates an exploded diagram of an electronic device according to an embodiment of the present disclosure.

The invention is described below in detail with reference to the accompanying drawings, wherein like reference numerals are used to identify like elements illustrated in one or more of the figures thereof, and in which exemplary embodiments of the invention are shown. This invention may, however, be embodied in many different forms and should not be construed as limited to the particular embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

It should be understood that, when an element or layer is referred to herein as being "disposed on", "connected to" or "coupled to" another element or layer, it can be directly disposed on, connected or coupled to the other element or layer, or alternatively, that intervening elements or layers may be present. In contrast, when an element is referred to as being "directly disposed on," "directly connected to" or "directly coupled to" another element or layer, there are no intervening elements or layers present. In the figures, like numbers refer to like elements throughout. As used herein, the term "and/or" includes any and all combinations of one or more of the associated listed items.

Different methods or examples are introduced to elaborate different structures in the embodiments of the present disclosure. To simplify the method, only specific components and devices are elaborated by the present disclosure. These embodiments are truly exemplary instead of limiting the present disclosure. Identical numbers and/or letters for reference are used repeatedly in different examples for simplification and clearance. It does not imply that the relations between the methods and/or arrangement. The methods proposed by the present disclosure provide a variety of examples with a variety of processes and materials. However, persons skilled in the art understand ordinarily that the application of other processes and/or the use of other kinds of materials are possible.

Please refer to FIG. 1 illustrating an exploded diagram of an electronic device 10 according to an embodiment of the present disclosure. The electronic device 10 having a display panel can be a smartphone, an e-book, a tablet computer, a notebook computer, or a personal digital assistant (PDA).

Referring to FIG. 1, an electronic device 10 according to an exemplary embodiment includes a display module 1, a circuit board 2 and a housing 3. The display module 1 includes a cover glass (CG), a light guide plate, and a total reflection display unit. The circuit board 2 is arranged in the housing 3. The display module is covered on the housing 3, and the display module. The sensor of the display module 1 and the display module 1 are electrically connected to the circuit board 2. The power supply can be arranged between the display module 1 and the circuit board 2. The display module 1 may be electrically connected to a printed circuit board provided on the housing via a flexible printed circuit. It should be noted that the electronic device 10 shown in FIG. 1 is not limited to the above content.

The cover glass is installed on the total reflection display unit and is arranged in front of the total reflection display unit to cover the total reflection display unit. A light guide plate is arranged between the cover glass and the total reflection display unit. The total reflection display unit, the light guide plate, and the cover glass are laminated and fixed to form the display module. The cover glass may be a transparent glass cover glass, so that the total reflection display unit can display through the cover glass. In some embodiments, the cover glass may be made of materials such as sapphire. In this embodiment, "front" refers to the direction facing the side of the display unit displaying information in the total reflection display unit, and "rear" refers to the direction opposite to "front".

The total reflection display unit is used for screen display of electronic files, and the total reflection display unit can display information such as images, videos or texts. The total reflection display unit may include a front surface that displays information, and a rear surface located on the opposite side of the front surface.

The display module 1 is mounted on the housing 3 of the electronic device 10. The display module 1 comprises a cover glass, a light guide plate and a total reflection display unit serves as a front part of the electronic device 10 and forms a closed space with the housing 3 for accommodating other electronic components of the electronic device 10. At the same time, the display module is used for displaying information such as images and text.

The circuit board 2 is installed inside the housing 3 to accommodate the circuit board 2 in the closed space. The circuit board 2 may be the main board of the electronic device 10. The circuit board 2 is provided with a grounding point to ground the circuit board 2. The circuit board 2 may be integrated with functional components such as a camera and a processor. At the same time, the flexible display panel 12 may be electrically connected to the circuit board 2.

In some embodiments, the circuit board 2 is provided with a display control circuit. The display control circuit outputs electrical signals to the flexible display panel 12 to control the flexible display panel 12 to display information.

The housing 3 is used to form the outer contour of the electronic device 10. The material of the housing 3 can be plastic or metal. The housing 3 can be integrally formed. Optionally, the housing 3 may be a metal housing, such as magnesium alloy, stainless steel and other metals. It should be noted that the material of the housing 3 can be a plastic housing, a ceramic housing or a glass housing.

In some embodiments, the battery may be logically connected to the processor through a power management system, so that functions such as charging, discharging, and power consumption management can be managed through the power management system. The battery may also include any components such as one or more DC or AC power sources, recharging systems, power failure detection circuits, power converters or inverters, and power status indicators.

Further, the circuit board 2 may also include a radio frequency (RF) circuit, one or more computer-readable storage media, an input unit, a display unit, a sensor, an audio circuit, and a Wireless Fidelity (Wi-Fi) module, one or more processors, a control circuit, a battery, a front camera, a rear camera, a fingerprint unlocking module, an antenna and other components.

The control circuit is installed in the circuit board 2. The control circuit can be the main board of the electronic device 10. The control circuit can be integrated with one or more functional components selecting from a motor, a microphone, a speaker, a headphone interface, a universal serial bus interface, a front camera, a rear camera, a distance sensor, an ambient light sensor, a receiver, and a processor.

In some embodiments, the control circuit may be fixed in the circuit board 2. Specifically, the control circuit can be screwed to the circuit board 2 by screws, or it can be buckled to the circuit board 2 by means of a buckle. It should be noted that the way of fixing the control circuit to the circuit board 2 in the embodiment of the present disclosure is not limited to this, and other methods, such as a method of joint fixing by a buckle and a screw, may also be used.

In some embodiments, the circuit board 2 may include a plastic part and a metal part. The circuit board 2 may be a shell structure in which metal and plastic cooperate with each other. Specifically, the metal part may be formed first, for example, a magnesium alloy substrate is formed by injection molding. Afterwards, a plastic substrate is formed on the magnesium alloy substrate by injecting plastic, which forms the shell structure. It should be noted that the material and process of the circuit board 2 are not limited to this.

In summary, the embodiment of the present disclosure provides an electronic device including a display module. The display module is provided with a reflective layer on a frame surrounding a total reflection display unit. Light emitting to the surface of the light-shielding portion or entering into the light-shielding portion is reflected back to the RLCD by the reflective layer, avoiding the waste of light scattered in the light-shielding portion due to the propagation path of the light, thereby improving the light utilization.

Figure 2:
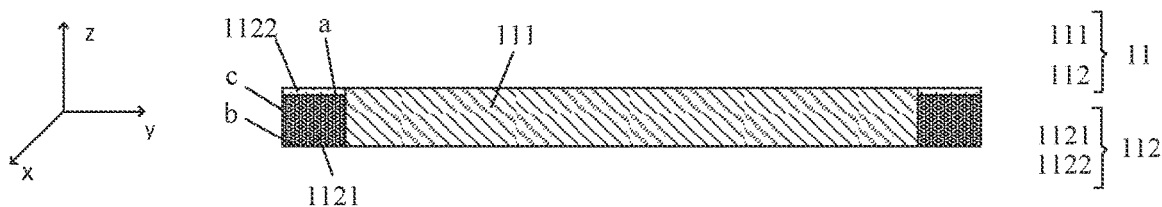
FIG. 2 illustrates a schematic diagram of a display panel according to a first embodiment of the present disclosure.
Figure 3:
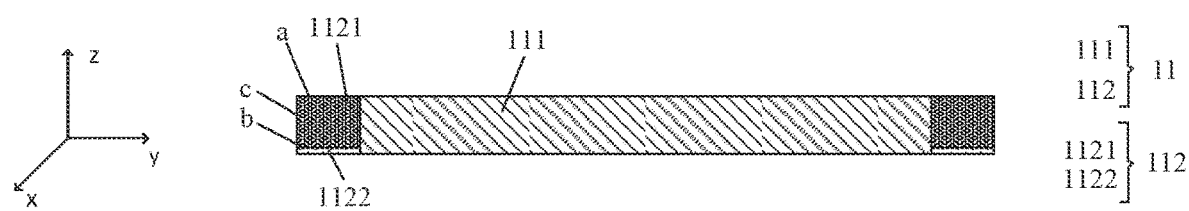
FIG. 3 illustrates a schematic diagram of a display panel according to a second embodiment of the present disclosure.

Please refer to FIGS. 2 and 3. FIGS. 2 and 3 are the display panel according to the embodiment of the present disclosure. The display panel 11 includes a total reflection display unit 111 and a frame 112 surrounding the total reflection display unit 11. The frame 112 includes a light shielding portion 1121 and a reflective layer 1122. The light shielding portion 1121 includes a first surface a and a second surface b parallel to the first direction, the first surface a and the second surface b are disposed opposite to each other, and the reflective layer 1122 covers the first surface a or the second surface b. Specifically, the first direction is shown by the y axis. As shown in FIG. 2, the reflective layer 1122 covers the first surface a of the light shielding portion 1121, or as shown in FIG. 3, the reflective layer 1122 covers the second surface b of the light shielding portion 1121.

The light shielding portion 1121 can be a black matrix (BM). The purpose of the light shielding portion 1121 is to prevent light leakage between pixels or to prevent light leakage in the edge area outside the pixels. It can also be used for wiring of data signals and scan signals. The reflective layer 1122 includes but is not limited to being printed on the surface of the BM through processes such as silk screen printing and coating.

In some embodiments, the thickness of the frame 112 is the same as the thickness of the total reflection display unit 111.

In summary, an embodiment of the present disclosure provides a display panel. The display panel 11 is provided with a reflective layer 1122 on the first surface a or the second surface b of the light-shielding portion 1121 of the frame 112 disposed around the total reflection display unit 111. The reflective layer 1122 can reflect the light irradiated on the surface of the light shielding portion 1121 or entering the light shielding portion 1121 back to the total reflection display unit 111 again, avoiding the waste caused by the scattered light caused by the propagation path of the light, thereby improving the utilization rate of light.

Figure 4:
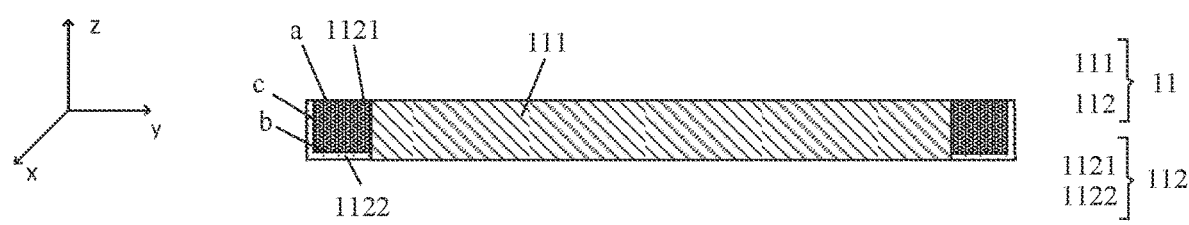
FIG. 4 illustrates a schematic diagram of a display panel according to a third embodiment of the present disclosure.

In some embodiments, referring to FIG. 4, the light shielding portion 1121 further includes a third surface c perpendicular to the first direction. The third surface c is a surface away from the total reflection display unit 111. The reflective layer 1122 may cover the second surface b and the third surface c. The display panel 11 is provided with the reflective layer 1122 on the second surface b and the third surface c of the light shielding layer 1121 of the frame 112 arranged around the total reflection display unit 111. Light emitting to the surface of the light shielding layer 1121 or light entering the light shielding portion 1121 are reflected back to the total reflection display unit 111 again by the reflective layer 1122. The reflective layer 1122 is added to the third surface c to prevent light from leaking from the side and avoid waste caused by scattered light due to the propagation path of the light, thereby improving the utilization rate of light.

Figure 5:
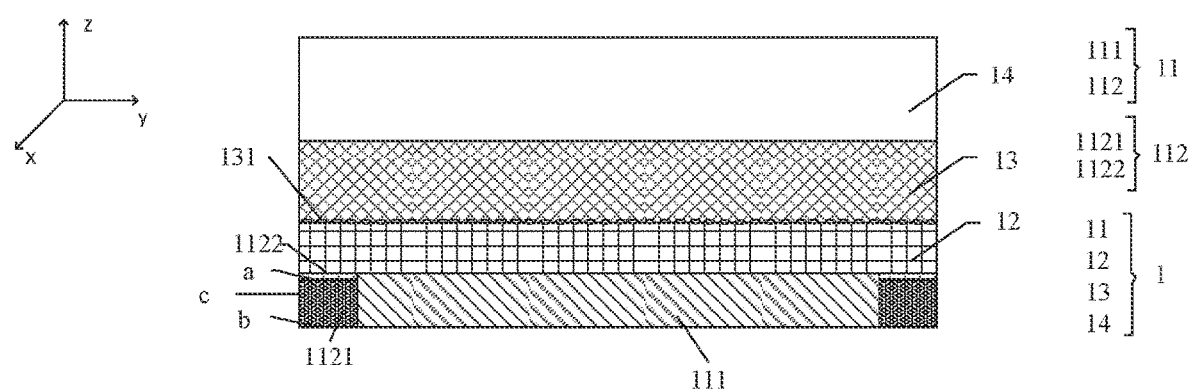
FIG. 5 illustrates a schematic diagram of a display module according to a fourth embodiment of the present disclosure.

Please also refer to FIG. 5, an embodiment of the present disclosure provides a display module 1. The display module 1 includes a display panel 11, an optical glue 12, a light guide plate 13, and a cover glass 14. The display panel 11 includes a total reflection display unit 111, and a frame 112 disposed around the total reflection display unit 111. The frame 112 includes a light shielding portion 1121 and a reflective layer 1122. The light shielding portion 1121 includes a first surface a and a second surface b parallel to the first direction, the first surface a and the second surface b are disposed opposite to each other, and the reflective layer 1122 covers the first surface a. Optionally, the first surface a is close to the side of the light guide plate 13, and the first direction is indicated by the y-axis.

In one embodiment, the cover glass 14 is laminated and fixedly arranged with the light guide plate 13 through optical glue 12 (e.g. Optically Clear Adhesive, OCA), the total reflection display unit 111 is laminated and fixedly arranged with the light guide plate 13 through the optical glue 12. The cover glass 14, the light guide plate 13 and the total reflection display unit 111 are stacked and fixed in sequence. Light sources are disposed near the light guide plate 13.

Optionally, the material of the light guide plate 13 may be a high light-transmitting material, such as polycarbonate (PC) or polymethyl methacrylate (PMMA).

In an embodiment, a plurality of light guide dots 131 are provided on the end surface of the light guide plate 13 close to the side of the total reflection display unit 111. The light guide dots 131 may be a groove-shaped structures that may be circular grooves, rectangular grooves or spherical grooves.

In an embodiment, the end surface of the light guide plate 13 is provided with a first light guide area and a second light guide area. The first light guide area is corresponding to the frame 112, the second light guide area is corresponding to the total reflection display unit 111. The number of light guide dots 131 in the first light guide area is greater than the number of light guide dots in the second light guide area.

In one embodiment, in order to avoid waste of light scattered on the frame 112 due to the propagation path of the light, the light guide dots in the first light guide area are gradually decreased along the second direction. The second direction is consistent with the irradiation direction of the light source.

In an embodiment, the display module 1 further includes a cover glass 14. The cover glass 14 and the light guide plate 13 are laminated and fixedly arranged. A reflective layer 1122 is provided on the side of the cover glass 14 close to the light guide plate 13.

Figure 6:
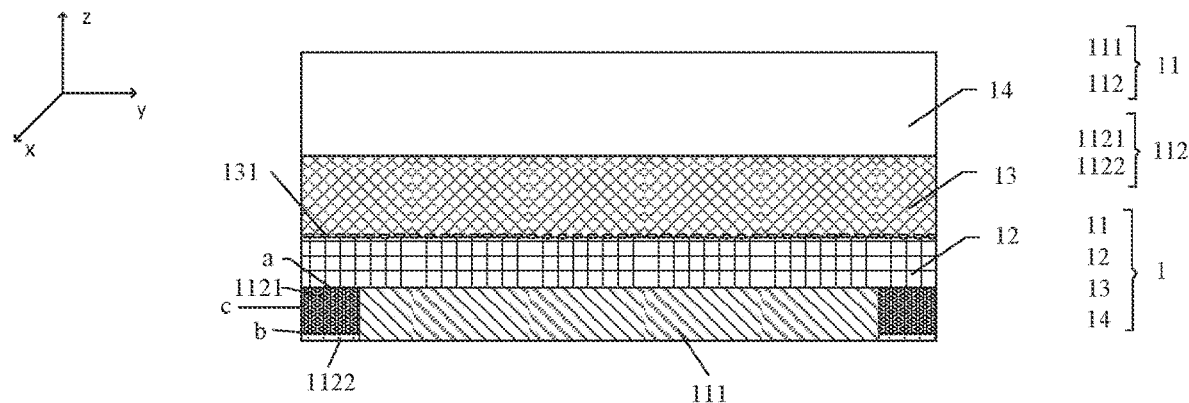
FIG. 6 illustrates a schematic diagram of a display module according to a fifth embodiment of the present disclosure.

Please refer to FIG. 6. An embodiment of the present disclosure provides a display module 1. The display module 1 includes a display panel 11, an optical glue 12, a light guide plate 13, and a cover glass 14. The display panel 11 includes a total reflection display unit 111, and a frame 112 disposed around the total reflection display unit 111. The frame 112 includes a light shielding portion 1121 and a reflective layer 1122. The light shielding portion 1121 includes a first surface a and a second surface b parallel to the first direction. The first surface a and the second surface b are disposed opposite to each other, and the reflective layer 1122 covers the second surface b. Optionally, the second surface b is a surface away from the light guide plate 13, and the first direction is indicated by the y-axis.

In one embodiment, the cover glass 14 is laminated and fixedly arranged with the light guide plate 13 through optical glue 12 (e.g. Optically Clear Adhesive, OCA). The total reflection display unit 111 is laminated and fixedly arranged with the light guide plate 13 through the optical glue 12. The cover glass 14, the light guide plate 13 and the total reflection display unit 111 are stacked and fixed in sequence. Light sources are disposed near the light guide plate 13.

Optionally, the material of the light guide plate 13 may be a high light-transmitting material, such as polycarbonate (PC) or polymethyl methacrylate (PMMA).

In an embodiment, a plurality of light guide dots 131 are provided on the end surface of the light guide plate 13 close to the side of the total reflection display unit 111. The light guide dots 131 may be a groove-shaped structures that may be circular grooves, rectangular grooves or spherical grooves.

In an embodiment, the end surface of the light guide plate 13 is provided with a first light guide area and a second light guide area. The first light guide area is corresponding to the frame 112, the second light guide area is corresponding to the total reflection display unit 111. The number of light guide dots 131 in the first light guide area is greater than the number of light guide dots in the second light guide area.

In one embodiment, the light guide dots in the first light guide area are gradually decreased along the second direction. The second direction is consistent with the irradiation direction of the light source.

In an embodiment, the display module 1 further includes a cover glass 14. The cover glass 14 and the light guide plate 13 are laminated and fixedly arranged. A reflective layer 1122 is provided on the side of the cover glass 14 close to the light guide plate 13.

In summary, an embodiment of the present disclosure provides a display module. The display module 1 is provided with a reflective layer 1122 on the first surface a or the second surface b of the light-shielding portion 1121 of the frame 112 disposed around the total reflection display unit 111. Light emitting to the surface of the light shielding layer 1121 or light entering the light shielding portion 1121 are reflected back to the total reflection display unit 111 again by the reflective layer 1122. The reflective layer 1122 is added to the third surface c to prevent light from leaking from the side and avoid waste caused by scattered light due to the propagation path of the light, thereby improving the utilization rate of light.

Figure 7:
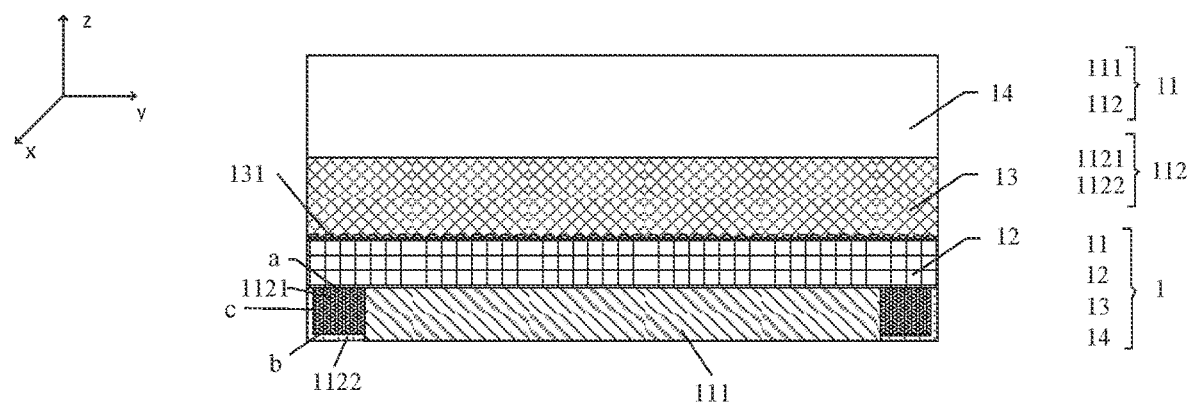
FIG. 7 illustrates a schematic diagram of a display module according to a sixth embodiment of the present disclosure.

Please also refer to FIG. 7. In order to avoid the waste caused by the light irradiated from the side of the light shielding portion, and avoid the waste of light scattered on the frame 112 due to the propagation path of the light, an embodiment of the present disclosure provides a display module 1. The display module 1 includes a display panel 11, an optical glue 12, a light guide plate 13, and a cover glass 14. The display panel 11 includes a total reflection display unit 111, and a frame 112 arranged around the total reflection display unit 111. The frame 112 includes a light shielding portion 1121 and a reflective layer 1122. The light shielding portion 1121 includes a first surface a and a second surface b parallel to the first direction. The first surface a and the second surface b are disposed opposite to each other, and the reflective layer 1122 covers the second surface b. The light shielding portion 1121 further includes a third surface c perpendicular to the first direction, and the third surface c is a surface away from the total reflection display unit 111. The reflective layer 1122 covers the second surface b and the third surface c. Specifically, the second surface b is a surface away from the light guide plate 13, and the first direction is the direction indicated by the y-axis.

In one embodiment, the cover glass 14 is laminated and fixedly arranged with the light guide plate 13 through optical glue 12 (e.g. Optically Clear Adhesive, OCA). The total reflection display unit 111 is laminated and fixedly arranged with the light guide plate 13 through the optical glue 12. The cover glass 14, the light guide plate 13 and the total reflection display unit 111 are stacked and fixed in sequence. Light sources are disposed near the light guide plate 13.

Optionally, the material of the light guide plate 13 may be a high light-transmitting material, such as polycarbonate (PC) or polymethyl methacrylate (PMMA).

In an embodiment, a plurality of light guide dots 131 are provided on the end surface of the light guide plate 13 close to the side of the total reflection display unit 111. The light guide dots 131 may be a groove-shaped structures that may be circular grooves, rectangular grooves or spherical grooves.

In an embodiment, the end surface of the light guide plate 13 is provided with a first light guide area and a second light guide area. The first light guide area is corresponding to the frame 112, the second light guide area is corresponding to the total reflection display unit 111. The number of light guide dots 131 in the first light guide area is greater than the number of light guide dots in the second light guide area.

In one embodiment, the light guide dots in the first light guide area are gradually decreased along the second direction. The second direction is consistent with the irradiation direction of the light source.

In an embodiment, the display module 1 further includes a cover glass 14. The cover glass 14 and the light guide plate 13 are laminated and fixedly arranged. The reflective layer 1122 is provided on the side of the cover glass 14 close to the light guide plate 13.

In summary, in the display panel, the display module, and the electronic device provided by the embodiments of the present disclosure, the reflective layer 1122 is disposed on the second surface b and the third surface c of the light-shielding portion 1121 of the frame 112 around the total reflection display unit 111. Light emitting to the surface of the light shielding layer 1121 or light entering the light shielding portion 1121 are reflected back to the total reflection display unit 111 again by the reflective layer 1122. The reflective layer 1122 is added to the third surface c to prevent light from leaking from the side and avoid waste caused by scattered light due to the propagation path of the light, thereby improving the utilization rate of light.

Above are embodiments of the present disclosure, which does not limit the scope of the present disclosure. Any modifications, equivalent replacements or improvements within the spirit and principles of the embodiment described above should be covered by the protected scope of the invention.

While the embodiments of the present disclosure have been shown and described above, it is to be understood that the above embodiments are exemplary and are not to be construed as limiting the present disclosure. One of ordinary skill in the art may make variations, modifications, substitutions and alterations to the above embodiments within the scope of the present disclosure.

What is claimed is:

1. A display module, comprising:
   a display panel, comprising:
      a total reflection display unit, wherein a plurality of light guide dots are disposed on an end surface of the light guide plate close to the total reflection display unit; and
      a frame enclosing the reflective display unit, comprising:
   a light-shielding portion, having a first surface parallel to a first direction and a second surface oppositely located to the first surface; and
      a reflective layer, covering the first surface or the second surface;
   an optical glue;
   a light guide plate stacked and fixed with the total reflection display unit through the optical glue, wherein light sources are disposed near the light guide plate,
   wherein the light guide plate comprises a first light guide area corresponding to the frame and a second light guide area corresponding to the total reflection display unit, and a number of light guide dots in the first light guide area is greater than the number of light guide dots in the second light guide area.

2. The display module of claim 1, wherein the light guide dots in the first light guide area are gradually decreased along a second direction, and the second direction is consistent with an irradiation direction of the light source.

3. The display module of claim 1, further comprising a cover glass stacked with the light guide plate, wherein a cover reflective layer is disposed near the light guide plate.

4. The display module of claim 1, wherein the light-shielding portion further comprises a third surface perpendicular to the first direction and away from the total reflection display unit.

5. The display module of claim 4, wherein the reflective layer covers the second surface and the third surface.

6. The display module of claim 1, wherein a thickness of the frame is similar to a thickness of the total reflection display unit.

7. An electronic device comprising:
   a housing;
   a circuit board disposed within the housing; and
   a display panel, comprising:
      a total reflection display unit, wherein a plurality of light guide dots are disposed on an end surface of the light guide plate close to the total reflection display unit; and
      a frame enclosing the reflective display unit, comprising:
   a light-shielding portion, having a first surface parallel to a first direction and a second surface oppositely located to the first surface; and
      a reflective layer, covering the first surface or the second surface;
   an optical glue;
   a light guide plate stacked and fixed with the total reflection display unit through the optical glue, wherein light sources are disposed near the light guide plate;
   wherein the display panel is disposed on the housing, and
   wherein the light guide plate comprises a first light guide area corresponding to the frame and a second light guide area corresponding to the total reflection display unit, and a number of light guide dots in the first light guide area is greater than the number of light guide dots in the second light guide area.

8. The electronic device of claim 7, wherein the light guide dots in the first light guide area are gradually decreased along a second direction, and the second direction is consistent with an irradiation direction of the light source.

9. The electronic device of claim 7, further comprising a cover glass stacked with the light guide plate, wherein a cover reflective layer is disposed near the light guide plate.

10. The electronic device of claim 7, wherein the light-shielding portion further comprises a third surface perpendicular to the first direction and away from the total reflection display unit.

11. The electronic device of claim 10, wherein the reflective layer covers the second surface and the third surface.

12. The electronic device of claim 7, wherein a thickness of the frame is similar to a thickness of the total reflection display unit.

* * * * *